(12) United States Patent
Mugali, Jr. et al.

(10) Patent No.: US 9,172,716 B2
(45) Date of Patent: Oct. 27, 2015

(54) SYSTEM AND METHOD FOR DETECTING DNS TRAFFIC ANOMALIES

(71) Applicant: VeriSign, Inc., Reston, VA (US)

(72) Inventors: Aditya Anand Mugali, Jr., Reston, VA (US); Andrew W. Simpson, Sterling, VA (US); Scott King Walker, Purcellville, VA (US)

(73) Assignee: VERISIGN, INC, Reston, VA (US)

( * ) Notice: Subject to any disclaimer, the term of this patent is extended or adjusted under 35 U.S.C. 154(b) by 0 days.

(21) Appl. No.: 13/672,277

(22) Filed: Nov. 8, 2012

(65) Prior Publication Data

US 2013/0117282 A1 May 9, 2013

Related U.S. Application Data

(60) Provisional application No. 61/557,255, filed on Nov. 8, 2011.

(51) Int. Cl.
*H04L 29/06* (2006.01)
*H04L 29/12* (2006.01)

(52) U.S. Cl.
CPC ........ *H04L 63/1441* (2013.01); *H04L 61/1511* (2013.01); *H04L 63/1425* (2013.01)

(58) Field of Classification Search
CPC ....... G06Q 30/02; G06Q 40/08; G06Q 40/00; G06Q 40/06; G06Q 10/107; G06Q 30/0201; G06Q 30/0283; G06Q 10/10; G06Q 30/00; G06Q 30/0631; G06F 17/2785; G06F 21/31; G06F 2221/2117; G06F 17/2745; G06F 11/3006; G06F 11/302; G06F 11/3051; G06F 11/3419; G06F 11/3447; G06F 11/3495; G06F 21/577; G06F 2201/875; G06F 2221/2101; G06F 9/5072; G06F 9/54; G06F 17/30321; G06F 17/30539; G06F 17/30551; G06F 17/30876; G06F 21/55; G06F 21/552; G06F 21/554; G06F 21/564; G06F 2221/2141; G06F 11/30; G06F 11/34; G06F 11/3409; G06F 11/3433; H04L 61/00; H04L 61/15; H04L 61/1505; H04L 61/1511; H04L 63/00; H04L 63/02; H04L 63/0227; H04L 63/0236; H04L 63/12; H04L 63/126; H04L 63/14; H04L 63/1408; H04L 63/1416; H04L 63/1425; H04L 63/1441; H04L 29/00; H04L 29/12; H04L 29/12009; H04L 29/12047; H04L 29/12056; H04L 29/12066
USPC .......... 707/748–754, E17.005, E17.014, 603, 707/723, 736, 741, 999.007, 999.104, 707/999.107, 999.2, 705; 709/223–224, 709/250, 206, 217, 225, 226, 230, 231, 201, 709/219, 227, 228, 245; 726/22–24; 719/318

See application file for complete search history.

(56) References Cited

U.S. PATENT DOCUMENTS 6,684,250 B2 1/2004 Anderson et al.
7,472,201 B1 12/2008 Aitken
(Continued)

FOREIGN PATENT DOCUMENTS

WO 2007050244 A2 5/2007

OTHER PUBLICATIONS

Roberto Perdisci et al., "Detecting Malicious Flux Service Networks through Passive Analysis of Recursive DNS Traces", Mar. 29, 2012, pp. 1-10 http://mmnet.iis.sinica.edu.tw/botnet/file/20100329/20100329_3.pdf, accessed Nov. 8, 2012.

(Continued)

*Primary Examiner* — Hosain Alam
*Assistant Examiner* — Diedra McQuitery
(74) *Attorney, Agent, or Firm* — MH2 Technology Law Group, LLP (57) ABSTRACT

Systems and methods for analyzing domain name system ("DNS") lookup data perform operations that may include: calculating traffic scores for a network address based on a set of DNS lookup data associated with the network address, where the set of DNS lookup data includes a plurality of query records having one or more queried network addresses; calculating a first variance and a second variance for the network address based on the traffic scores for the network address; and determining a rank of the network address based on the first and second variances.

26 Claims, 4 Drawing Sheets

(56) References Cited

U.S. PATENT DOCUMENTS

| | | | |
|---|---|---|---|
| 7,523,016 B1* | 4/2009 | Surdulescu et al. | 702/185 |
| 7,626,940 B2 | 12/2009 | Jain | |
| 7,926,108 B2 | 4/2011 | Rand et al. | |
| 8,260,914 B1* | 9/2012 | Ranjan | 709/224 |
| 8,261,351 B1 | 9/2012 | Thornewell et al. | |
| 8,347,394 B1* | 1/2013 | Lee | 726/25 |
| 8,516,104 B1* | 8/2013 | Liu et al. | 709/224 |
| 8,646,064 B1* | 2/2014 | Holloway et al. | 726/12 |
| 8,676,964 B2* | 3/2014 | Gopalan et al. | 709/224 |
| 2001/0034637 A1* | 10/2001 | Lin et al. | 705/10 |
| 2002/0032717 A1* | 3/2002 | Malan et al. | 709/105 |
| 2004/0205374 A1* | 10/2004 | Poletto et al. | 714/4 |
| 2004/0221190 A1* | 11/2004 | Roletto et al. | 714/4 |
| 2008/0028463 A1* | 1/2008 | Dagon et al. | 726/22 |
| 2008/0043620 A1* | 2/2008 | Ye | 370/232 |
| 2009/0180391 A1* | 7/2009 | Petersen et al. | 370/252 |
| 2010/0037314 A1* | 2/2010 | Perdisci et al. | 726/22 |
| 2010/0100957 A1 | 4/2010 | Graham et al. | |
| 2010/0115617 A1* | 5/2010 | Weber et al. | 726/23 |
| 2010/0138919 A1* | 6/2010 | Peng et al. | 726/22 |
| 2010/0257266 A1* | 10/2010 | Holmes et al. | 709/224 |
| 2010/0274970 A1 | 10/2010 | Treuhaft et al. | |
| 2010/0290346 A1* | 11/2010 | Barford et al. | 370/242 |
| 2011/0119226 A1* | 5/2011 | Ruhl et al. | 706/52 |
| 2011/0191455 A1 | 8/2011 | Gardner | |
| 2011/0283357 A1* | 11/2011 | Pandrangi et al. | 726/22 |
| 2011/0314145 A1* | 12/2011 | Raleigh et al. | 709/224 |
| 2012/0159623 A1 | 6/2012 | Choi | |
| 2012/0173710 A1* | 7/2012 | Rodriguez | 709/224 |
| 2012/0233311 A1* | 9/2012 | Parker et al. | 709/224 |
| 2012/0246290 A1 | 9/2012 | Kagan | |

OTHER PUBLICATIONS

European Search Report, dated Mar. 11, 2013, European Application No. 12191876.7, filed Nov. 8, 2012, pp. 1-4, published by the European Patent Office.

* cited by examiner

SYSTEM AND METHOD FOR DETECTING DNS TRAFFIC ANOMALIES

CROSS REFERENCE TO RELATED APPLICATIONS

This application claims the benefit of, and priority from U.S. Provisional Patent Application Ser. No. 61/557,255, filed Nov. 8, 2011, which is hereby incorporated by reference in its entirety.

FIELD

The present disclosure relates to domain name system ("DNS") traffic analysis. More particularly, the present disclosure relates to systems and methods for detecting anomalies in DNS traffic based on DNS lookup data.

SUMMARY

In one embodiment, there may be provided a method for analyzing DNS lookup data, comprising: calculating a plurality of traffic scores for a network address based on a set of DNS lookup data associated with the network address, wherein the set of DNS lookup data includes a plurality of query records having one or more queried network addresses; calculating a first variance and a second variance for the network address based on the plurality of traffic scores for the network address; and determining a rank of the network address based on the first and second variances.

In another embodiment, there may be provided a system for analyzing DNS lookup data. The system comprises a processor and a memory communicatively coupled to the processor. The processor can be configured to: calculate a plurality of traffic scores for a network address based on a set of DNS lookup data associated with the network address, wherein the set of DNS lookup data includes a plurality of query records having one or more queried network addresses; calculate a first variance and a second variance for the network address based on the plurality of traffic scores for the network address; and determine a rank of the network address based on the first and second variances.

Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings.

DETAILED DESCRIPTION

Reference will now be made in detail to exemplary embodiments, examples of which are illustrated in the accompanying drawings. When appropriate, the same reference numbers are used throughout the drawings to refer to the same or like parts.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

The Domain Name System ("DNS"), the Internet's lookup service for mapping domain names to Internet Protocol ("IP") addresses, provides a critical infrastructure for Internet applications. The prevalence of DNS lookups can help network operators discover valuable information about the nature of domains that are being looked up. The term "DNS lookup data" may include data related to domain name resolution at different levels of DNS hierarchy. Top-level domain ("TLD") DNS lookup data may also include domain name queries submitted by Recursive Name Servers ("RNSs"). The source IP addresses from the domain name queries can be aggregated to characterize network traffic that was interested in at least one queried domain during an observed window. The IP addresses corresponding to the RNSs requesting the at least one queried domain can further be aggregated into /24 subnets if it is deemed appropriate to mitigate against double counting queries out of the same network segment. Therefore, DNS lookup data may include query records showing the relationship between the queried domain name and the queriers.

DNS traffic anomalies may be detected by analyzing DNS lookup data. DNS traffic anomalies may indicate that a particular domain or an entity associated with that particular domain has launched a new product that is garnering a lot of attention, aired a commercial directing traffic to that particular domain, or possibly engaged in more malicious activities like spamming, phishing, malware, or involvement in a botnet. For more information on the detection of malicious domains by analyzing DNS lookup patterns, see Shuang Hao et al., "An Internet-Wide View Into DNS Lookup Patterns," published June 2010 by VeriSign Incorporated, the entire contents of which are expressly incorporated herein by reference.

In particular, domains associated with scams and botnets may exhibit more churn in terms of the networks that look them up from day to day. Therefore, by analyzing DNS lookup patterns, domains exhibiting anomalous behaviors may be identified, the anomalous behaviors not being limited to malicious activities or other behaviors deemed harmful. In addition, domains exhibiting similar spatial lookup patterns may also exhibit other similarities. Results from prior efforts to determine anomalous behavior may be used to generate groups of domains and filter them based on known behaviors of their neighbors. Moreover, a domain that is newly registered and exhibits unusual traffic may be categorized as having suspicious behaviors. Finally, blacklisted domains may typically be queried by a much wider range of subnets, particularly for newly registered domains.

Figure 1:
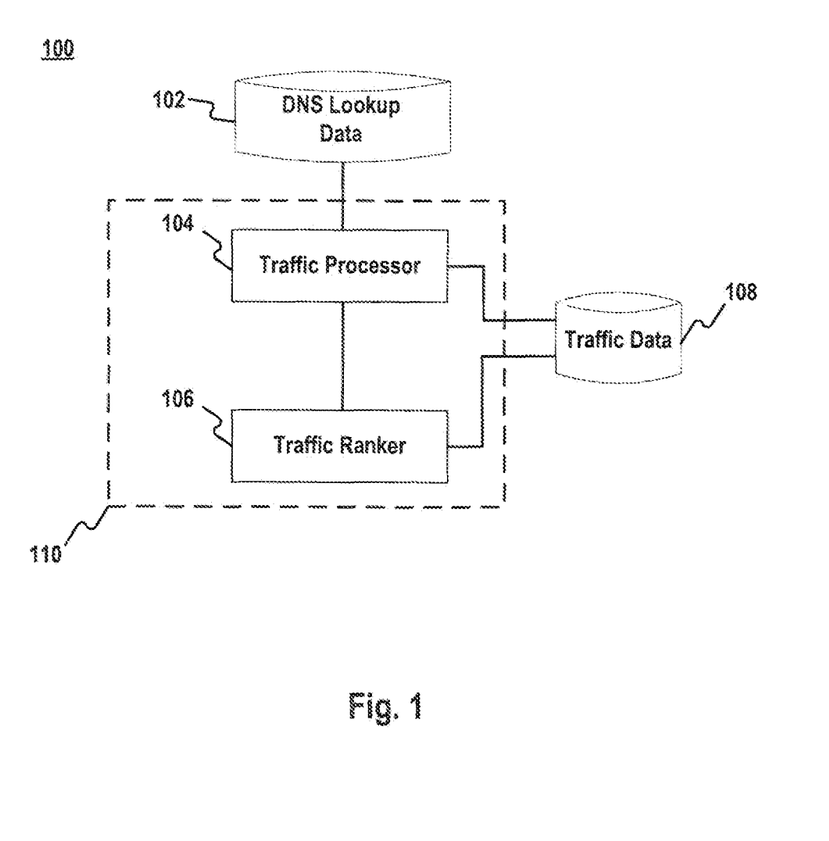
FIG. 1 is a schematic diagram illustrating an exemplary DNS traffic analyzing system consistent with some disclosed embodiments.

FIG. 1 illustrates an exemplary DNS traffic analyzing system 100. System 100 may include a traffic processor 104 and a traffic ranker 106, both of which may be processors, computers, or any other devices capable of processing data. In some embodiments, traffic processor 104 and traffic ranker 106 may also be implemented as a single processor 110. Traffic processor 104 may obtain DNS lookup data from database 102. Database 102 may be associated with DNS servers, such as TLD DNS servers, and database 102 contains DNS lookup data concerning DNS queries and other domain registration-related data such as, for example, when the domain was created. For example, the DNS lookup data may include DNS queries from a plurality of RNSs that query a domain name. Based on the DNS lookup data, traffic processor 104 may calculate a traffic score for a target domain. As used herein, the term "network address" may include a domain name and its corresponding IP addresses. In some embodiment, the traffic score may be calculated based on a number of unique RNSs requesting the network address. In this respect, multiple requests from the same RNS may be considered as a single request. In some embodiments, traffic processor 104 may calculate a traffic score for a group of network addresses, such as IP addresses in the same/24 subnet (i.e., class C subnet). Traffic processor 104 may store the traffic score in a database 108.

Alternatively or additionally, traffic processor 104 may calculate a geolocation percentage associated with a target domain based on DNS lookup data. For example, traffic processor may analyze the network addresses of the queriers who query a particular network address, and obtain geolocation information based on the queriers' network addresses and/or geoIP maps. Traffic processor 104 may then group DNS traffic based on the geolocation information, and calculate a percentage for traffic originated from different geolocations. In some embodiments, the geolocation percentage may be calculated for a group of network addresses, such as IP addresses in the same/24 subnet (i.e., class C subnet). Traffic processor 104 may store the geolocation percentage in a database 108.

Figure 2:
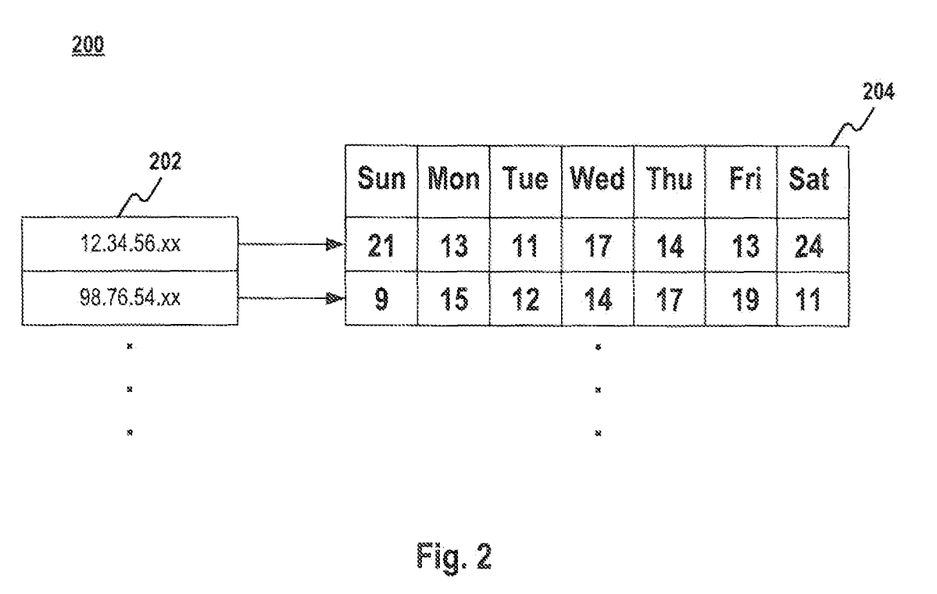
FIG. 2 illustrates exemplary traffic scores consistent with some disclosed embodiments.

FIG. 2 illustrates exemplary traffic scores. In various embodiments, anomalous behavior for a domain may be detected by determining the traffic or query pattern for the domain exhibited over one specific defined period of time (e.g., Monday) and comparing that traffic/query pattern to the typical or average traffic/query pattern over a longer period of time (e.g., Mondays over the past three months). In other words, to detect and/or identify a domain exhibiting anomalous behavior, daily traffic scores during a week for a subnet associated with the domain can be compared to corresponding daily traffic scores during a different week for that subnet. For example, to detect and/or identify a domain exhibiting anomalous behavior, the daily traffic score for a particular day (e.g., Monday) during a current week for a subnet associated with the domain can be compared to the daily traffic score for that particular day (e.g., Monday) during one or more previous weeks for the subnet.

In the example shown in FIG. 2, traffic scores are stored in a 7-column data block 204, each column corresponding to a different day of a week. Each row of data block 204 corresponds to daily traffic scores during a period of time (e.g., a week) for each network address or group of network addresses. For example, data block 202 shows groups of network addresses grouped by /24 subnet addresses. In the example shown in FIG. 2, the first subnet "12.34.56.xx" has daily traffic scores of 21, 13, 11, 17, 14, 13, and 24, on each different day of a week, from Sunday to Saturday. Similarly, the second subnet "98,76.54.xx" has daily traffic scores of 9, 15, 12, 14, 17, 19, and 11, from Sunday to Saturday. The daily traffic score may be the actual number of requests querying any one of the network addresses within a /24 subnet, or a normalized value based on various considerations.

Traffic processor 104 may update the daily traffic scores by calculating a moving average. For example, assuming the daily traffic scores shown in data block 204 are results of a first week's operation, when a new week begins (e.g., Sunday), the Sunday traffic score, e.g., 21 of subnet "12.34.56.xx," may be updated by taking into account a current traffic score, e.g., 25, calculated from DNS lookup data of this Sunday. Specifically, the updated Sunday score may be calculated as a moving average, as follows:

Updated score=(previous score*number of weeks+ current score)/(number of weeks+1).

In the above equation, the "number of weeks" refers to number of scored weeks associated with the previous daily traffic score. Therefore, using the data discussed above, the updated Sunday traffic score would be (21*1+25)/(1+1)=23. If the traffic score of next Sunday is 14, then the next updated Sunday score would be (23*2+14)/(2+1)=20.

Similar calculations may be performed for each day of a week. As a result, a moving average of traffic score for each day of a week can be obtained. As the number of weeks increase, the moving average may exhibit valuable patterns that can be used to determine DNS traffic anomalies. It should be noted that the data structure 200 shown in FIG. 2 is only an example. Any suitable data structure can be utilized to achieve the above-discussed operations.

Figure 3:
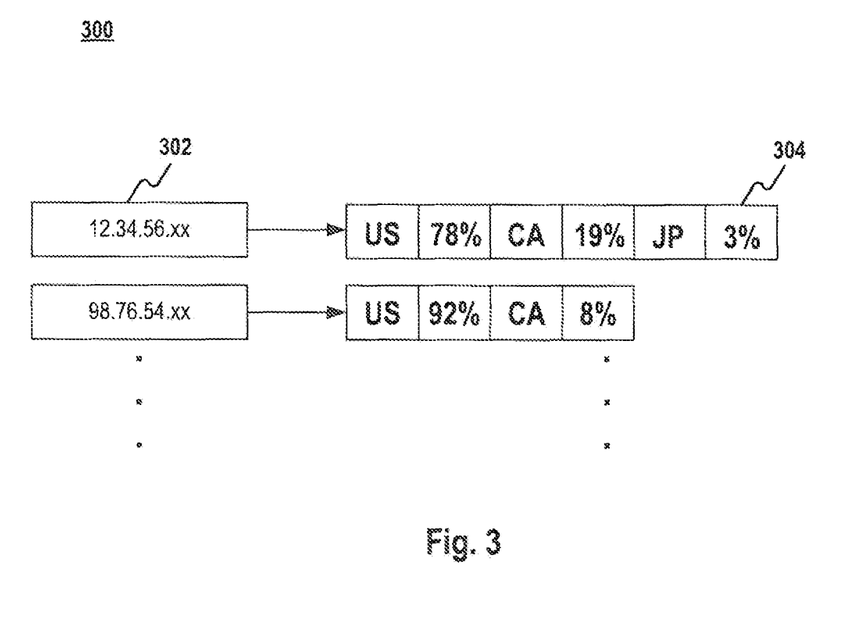
FIG. 3 illustrates exemplary geolocation percentages consistent with some disclosed embodiments.

FIG. 3 illustrates exemplary geolocation percentages. Similar to FIG. 2, data block 302 shows subnets that are looked up by queriers. Data block 304 shows exemplary geolocation percentages associated with the subnet and grouped by countries. For example, the first row of data block 304 indicates that 78% query traffic is from the US, 19% from Canada, and 3% from Japan. Other geolocation scopes, such as continents, regions, states, provinces, cities, corporations, etc., may also be used to calculate the geolocation percentages.

Traffic processor 104 may update the geolocation percentage periodically. For example, the update may be performed daily, by calculating simple average of the previous day's percentage and the current day's percentage. In addition, locations that fail to appear the next day may be removed from data block 304. New locations may also be added to data block 304 if they have appeared for, e.g., two days. Of course, other time periods may be used in the calculation. Similar to the daily traffic score, normalization may be performed based on various considerations. It should be noted that the data structure 300 shown in FIG. 3 is only an example. Any suitable data structure can be utilized to achieve the above-discussed operations.

Referring back to FIG. 1, traffic ranker 106 may access database 108 to obtain traffic data, such as traffic scores and geolocation percentages calculated by traffic processor 104. Based on the traffic data, the traffic ranker 106 may calculate a first variance based on a previous daily traffic score and the updated daily traffic score; and a second variance based on a previous geolocation percentage and a current geolocation percentage (for a given location), for a particular day of interest. Traffic ranker 106 may then sum up the first and second variances, and obtain a rank for the network address (or the group of network addresses). The rank may indicate the churn of queriers that look up the network address from day to day, taking into account both the number and geolocation distribution of the queries. For example, a higher rank (larger value of the sum of variances) may indicate a higher chance of traffic anomalies.

Figure 4:
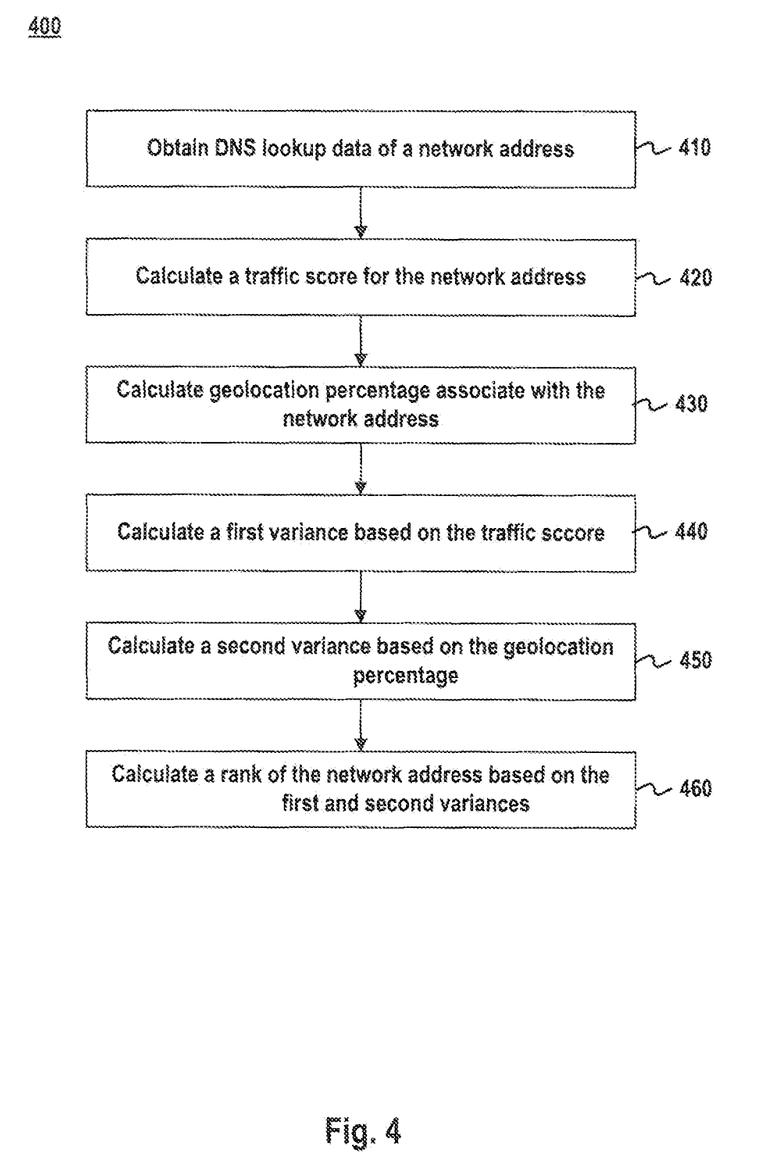
FIG. 4 is a flow chart of an exemplary method for analyzing DNS traffic consistent with some disclosed embodiments.

FIG. 4 is a flow chart of an exemplary method for analyzing DNS lookup data, in accordance with some embodiments. As shown in FIG. 4, method 400 may include a series of steps, some of them may be optional. As an example, in step 410, traffic processor 104 may obtain DNS lookup data of a network address. In step 420, traffic processor 104 may calculate a traffic score for the network address based on the DNS lookup data. In step 430, traffic processor 104 may calculate a geolocation percentage associated with the network address based on the DNS lookup data. In step 440, traffic ranker 106 may calculate a first variance based on the traffic score. In step 450, traffic ranker 106 may calculate a second variance based on the geolocation percentage. In step 460, traffic ranker 106 may calculate a rank of the network address based on the first and second variances.

In some embodiment, traffic score and/or geolocation percentage may be modified based on DNS traffic variations. Such variations may include, for example, holidays. In a holiday, especially when the holiday is also a weekday, DNS traffic may exhibit a different pattern from a non-holiday weekday. Other incidences that may not be considered as anomalies include topical trending. For example, when a company releases a new product, the company's domain name may receive larger than normal queries. In another example, when a pharmaceutical company advances to a new clinical trial stage, larger than normal traffic may also be expected. Such incidences that relate to one or more "topics," can be referred as "topical trending." The system and method disclosed herein may modify traffic scores and/or geolocation percentages resulting from such topical trending.

In the foregoing descriptions, various aspects, steps, or components are grouped together in a single embodiment for purposes of illustrations. The disclosure is not to be interpreted as requiring all of the disclosed variations to the claimed subject matter. The following claims are incorporated into this Description of the Exemplary Embodiments, with each claim standing on its own as a separate embodiment of the invention.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method for analyzing Domain Name System (DNS) lookup data, comprising:
    calculating, by a processor, a plurality of traffic scores for a network address that includes a domain name based on a set of DNS lookup data associated with the network address, wherein the set of DNS lookup data includes a plurality of source network addresses of queriers;
    obtaining two or more traffic scores of the plurality of traffic scores based on numbers of unique Recursive Name Servers (RNSs) requesting the network address during a same time window within two or more respective time periods, wherein the two or more traffic scores include a current traffic score that corresponds to the same time window of a current time period and a previous traffic score that corresponds to the same time window of at least one previous time period;
    calculating an updated traffic score based on an average of the current traffic score and the previous traffic score;
    updating the current traffic score based on the updated traffic score:
    calculating, subsequent to updating the current traffic score, a first variance based on a variation between the two or more traffic scores;
    calculating two or more geolocation percentages for the network address based on different geolocations associated with one or more of the plurality of source network addresses of one or more of the queriers requesting the network address during the same time window of the two or more respective time periods;
    calculating a second variance for the network address based on a variation between the two or more geolocation percentages; and
    determining a rank of the network address based on the first and second variances.

2. The computer-implemented method of claim 1, further comprising;
    receiving the DNS lookup data from a top-level domain DNS server.

3. The computer-implemented method of claim 1, wherein the DNS lookup data is related to a group of network addresses.

4. The computer-implemented method of claim 1, wherein each time period corresponds to a week and each time window corresponds to a day of the week, the method further comprising:
    obtaining a first daily traffic score calculated based on a number of unique RNSs requesting the network address during a specific day of a first week;
    obtaining a second daily traffic score calculated based on a number of unique RNSs requesting the network address during the specific day of at least one week prior to the first week;
    calculating an updated daily traffic score based on an average of the first daily traffic score and the second deli traffic scores;
    updating the first daily traffic score based on the updated daily traffic score; and
    calculating, subsequent to updating the first daily traffic score, the first variance based on a variation between the first and second daily traffic scores.

5. The computer-implemented method of claim 1, wherein each time period corresponds to a week and each time window corresponds to a day of the week, the method further comprising:
    calculating a current daily traffic score for a current day of a current week.

6. The computer-implemented method of claim 5, further comprising:
calculating an updated daily traffic score based on an average of the current daily traffic score and a previous daily traffic score corresponding to the current day of one or more previous weeks: and
updating the current daily traffic score based on the updated daily traffic score.

7. The computer-implemented method of claim 6, further comprising:
calculating the first variance, subsequent to updating the current daily traffic score, based on a variation between the previous daily traffic score and the current daily traffic score.

8. The computer-implemented method of claim 1, wherein calculating the updated traffic score further comprises:
normalizing the previous traffic score based on a number of time periods in the at least one previous time period.

9. The computer-implemented method of claim 1, further comprising:
updating at least one of the two or more geolocation percentages at least once a day, wherein updating the at least one geolocation percentage includes removing a geolocation of the different geolocations having an amount of traffic below a threshold within a predetermined period.

10. The computer-implemented method of claim 1, herein the two or more respective time periods have a same duration.

11. The computer-implemented method of claim 1, further comprising:
calculating the second variance, based on a variation between two or more daily geolocation percentages over a series of two or more days.

12. The computer-implemented method of claim 1, further comprising:
determining if the network address has traffic anomalies based on the rank.

13. The computer-implemented method of claim 1, further comprising:
detecting a traffic variation that corresponds to a holiday in a time period of the two or more time periods; and
modifying, based on the traffic variation, at least one traffic score of the two or more traffic scores, wherein the at least one traffic score is associated with the time period.

14. A system for analyzing Domain Name System (DNS) lookup data, comprising:
a processor; and
a memory communicatively coupled to the processor;
wherein the processor is configured to perform operations comprising:
calculating a plurality of traffic scores for a network address that includes a domain name based on a set of DNS lookup data associated with the network address, wherein the set of DNS lookup data includes a plurality of source network addresses of queriers;
obtaining two or more traffic scores of the plurality of traffic scores based on numbers of unique Recursive Name Servers (RNSs) requesting the network address during a same time window within two or more respective time periods wherein the two or more traffic scores include a current traffic score that corresponds to the same time window of a current time period and a previous traffic score that corresponds to the same time window of at least one previous time period;
calculating an updated traffic score based on an average of the current traffic score and the previous traffic score;
updating the current traffic score based on the updated traffic score;
calculating, subsequent to updating the current traffic score a first variance based on a variation between the two or more traffic scores;
calculating two or more geoiocation percentages for the network address based on different geolocations associated with one or more of the plurality of source network addresses of one or more of the queriers requesting the network address during the same time window of the two or more respective time periods;
calculating a second variance for the network address based on a variation between the two or more geolocation percentages; and
determining a rank of the network address based on the first and second variances.

15. The system of claim 14, wherein the processor is further configured to perform operations comprising:
receiving the DNS lookup data from a top-level domain DNS server.

16. The system of claim 14, wherein the DNS lookup data is related to a group of network addresses.

17. The system of cairn 14, wherein each time period corresponds to a week and each time window corresponds to a day of the week, and wherein the processor is further configured to perform operations comprising:
obtaining a first daily traffic score calculated based on a number of unique RNSs requesting the network address during a specific day of a first week;
obtaining a second daily traffic score calculated based on a number of unique RNSs requesting the network address during the specific day of at least one week prior to the first week;
calculating an updated daily traffic score based on an average of the first daily traffic score and the second daily traffic score;
updating the first daily traffic score based on the updated daily traffic score; and
calculating, subsequent to updating the first daily traffic score, the first variance based on a variation between the first and second daily traffic scores.

18. The system of claim 14, wherein each time period corresponds to a week and each time window corresponds to a day of the week, and wherein the processor is further configured to perform operations comprising:
calculating a current daily traffic score for a current day of a current week.

19. The system of claim 18, wherein the processor is further configured to perform operations comprising:
calculating an updated daily traffic score based on an average of the current daily traffic score and a previous daily traffic score corresponding to the current day of one or more previous weeks; and
updating the current daily traffic score based on the updated daily traffic score.

20. The system of claim 19, wherein the processor is urther configured to perform operations comprising:
calculating the first variance, subsequent to updating the current daily traffic score, based on a variation between the previous daily traffic score and the current daily traffic score.

21. The system of claim 14, wherein the processor is further configured to perform operations comprising:
normalizing the previous traffic score based on a number of time periods in the at least one previous time period.

22. The system of claim 14, wherein the processor is further configured to perform operations comprising:

updating at least one of the two or more geolocation percentages at least once a day, wherein updating the at least one geolocation percentage includes removing a geolocation of the different geolocations having an amount of traffic below a threshold within a predetermined period.

23. The system of claim 14, wherein the two or more respective time periods have a same duration.

24. The system of claim 14, wherein the processor is further configured to perform operations comprising:
calculating the second variance based on a variation between two or more daily geolocation percentages over a series of two or more days.

25. The system of claim 14, wherein the processor is further configured to perform operations comprising:
determining if the network address has traffic area anomalies based on the rank.

26. The system of claim 14, wherein the processor is further configured to perform operations comprising:
detecting a traffic variation that corresponds in time to a holiday in a time period of the two or more time periods; and
modifying, based on the traffic variation, at least one traffic score of the two or more traffic scores, wherein the at least one traffic score is associated with the time period.

\* \* \* \* \*